United States Patent
Sawayanagi

(10) Patent No.: US 8,633,409 B2
(45) Date of Patent: Jan. 21, 2014

(54) WATERPROOF STRUCTURE OF WIRE LEADING PORTION

(75) Inventor: Masahiro Sawayanagi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 130 days.

(21) Appl. No.: 13/416,257

(22) Filed: Mar. 9, 2012

(65) Prior Publication Data

US 2012/0228022 A1 Sep. 13, 2012

(30) Foreign Application Priority Data

Mar. 10, 2011 (JP) .................................. 2011-052530

(51) Int. Cl.
*H05K 5/06* (2006.01)

(52) U.S. Cl.
USPC ............................. 174/564; 174/652; 174/656

(58) Field of Classification Search
USPC .......................................... 174/564, 652, 656
See application file for complete search history.

(56) References Cited

U.S. PATENT DOCUMENTS

| 5,491,300 | A | * | 2/1996 | Huppenthal et al. | ........... | 174/151 |
| 5,563,510 | A | * | 10/1996 | Gorrell et al. | .................. | 324/174 |
| 5,625,536 | A | * | 4/1997 | Soyano et al. | ................. | 361/736 |
| 7,739,791 | B2 | * | 6/2010 | Brandenburg et al. | ......... | 29/856 |
| 7,751,676 | B2 | * | 7/2010 | Riley et al. | ..................... | 385/138 |
| 8,247,708 | B1 | * | 8/2012 | Ayres et al. | ..................... | 174/564 |
| 8,479,455 | B2 | * | 7/2013 | Schaefer et al. | .................... | 52/58 |
| 2006/0032653 | A1 | * | 2/2006 | Minoshima et al. | ......... | 174/52.3 |
| 2010/0089638 | A1 | * | 4/2010 | Shinoda et al. | ............... | 174/564 |

FOREIGN PATENT DOCUMENTS

| JP | 6-325834 A | 11/1994 |
| JP | 8-213097 A | 8/1996 |

* cited by examiner

*Primary Examiner* — Hung Ngo
(74) *Attorney, Agent, or Firm* — Sughrue Mion, PLLC

(57) ABSTRACT

There is provided a waterproof structure of a wire leading portion. A rubber cap is assembled with wire connected to a circuit board. A housing accommodates the circuit board. A packing holder is accommodated next to the circuit board through an opening of the housing. A packing is assembled on an outer periphery of the packing holder to be in close contact with an inner surface of the housing. The packing holder includes: a rubber cap secession prevention wall formed in a direction that crosses an accommodation direction; a wire insertion hole formed to penetrate the wall; and a rubber cap accommodation chamber communicating with the wire insertion hole and continuing to an inner surface of the wall. The inner surface of the wall and a cross-section of the circuit board are formed to hold the rubber cap that is accommodated in the rubber cap accommodation chamber.

4 Claims, 6 Drawing Sheets

WATERPROOF STRUCTURE OF WIRE LEADING PORTION

The disclosure of Japanese Patent Application No. 2011-052530 filed on Mar. 10, 2011, including specification, drawings and claims is incorporated herein by reference in its entirety.

BACKGROUND

The present invention relates to a waterproof structure that can be adopted in a wire leading portion for leading a wire from a housing.

In an electric vehicle or a hybrid vehicle, battery charging is performed using a charger connector that is composed of a feeder-side connector and a receiver-side connector (vehicle-side inlet).

Patent Document 1 discloses a technology related to a charger connector. According to this disclosed technology, a receiver-side connector is installed in a receiver accommodation chamber in a vehicle. Further, a lamp is also installed in the receiver-side accommodation chamber. The lamp is a component which constitutes an illumination unit, and is turned on or off when a cover of the receiver-side accommodation is opened or closed. The lamp is installed to facilitate an assembling/disassembling work of the feeder-side connector and the receiver-side connector at night.

According to the illumination unit of Patent Document 1, although it is not clear whether a wire is led from the illumination unit, it is preferable that a wire leading portion adopts a waterproof structure if a wire is led therefrom. Further, a great number of waterproof structures effectively adopted in wire leading portions have been proposed. On of them may be a technology disclosed in Patent Document 2.

Patent Document 1: JP-A-6-325834
Patent Document 2: JP-A-8-213097

According to a waterproof structure disclosed in Patent Document 2, a rubber cap, into which a wire is penetratingly inserted, and an inner surface of a housing are sealed. This waterproof structure has problems in that if internal pressure of the housing is changed, the rubber cap may move.

Since the rubber cap is not only to seal the wire but also to seal an opening that is formed on a rear side portion of the housing, the size of the rubber cap becomes larger, and in order to assemble such a large-sized rubber cap, it is necessary to press the rubber cap with strong force. Accordingly, the workability becomes degraded.

In the case of adopting the waterproof structure disclosed in Patent Document 2, for example, in an illumination unit, it is necessary to solve the above-described problems.

SUMMARY

It is therefof an object of the present invention is to provide a waterproof structure of a wire leading portion which can prevent a rubber cap from moving and improve the workability.

According to a first aspect of the present invention, a waterproof structure of a wire leading portion comprising: a wire; a rubber cap assembled with the wire; a circuit board that is a connection destination of the wire; a housing accommodating the circuit board; a packing holder accommodated next to the circuit board through an opening of the housing; and a packing assembled on an outer periphery of the packing holder to be in close contact with an inner surface of the housing, wherein the packing holder includes: a rubber cap secession prevention wall that is a wall formed in a direction that crosses an accommodation direction; a wire insertion hole formed to penetrate the rubber cap secession prevention wall; and a rubber cap accommodation chamber communicating with the wire insertion hole and continuing to an inner surface of the rubber cap secession prevention wall, and wherein the inner surface of the rubber cap secession prevention wall and a cross-section of the circuit board are formed to hold the rubber cap that is accommodated in the rubber cap accommodation chamber.

According to the first aspect of the present invention, by accommodating the packing holder in which the packing is installed in the housing after accommodating the circuit board in the housing, the rubber cap can be held by the cross-section of the circuit board and the inner surface of the rubber cap secession prevention wall. Accordingly, the rubber cap is not moved even if the internal pressure of the housing is changed. Further, according to the present invention, since the outer surface of the packing holder and the inner surface of the housing are sealed by the packing, and the rubber cap accommodation chamber and the wire are sealed by the rubber cap, the structure according to the present invention is distinguished from the structure in the related art in which the sealing is achieved by one rubber cap. As a result, the rubber cap can be small-sized. Accordingly, it is not necessary to perform assembling with low workability, such as pressing with strong force. Further, according to the present invention, once the packing holder is accommodated in the housing, the sealing of the respective portions is completed with the movement of the rubber cap prevented, and thus the assembling work is not complicated. As described above, according to the present invention, the movement of the rubber cap is prevented, and the workability is improved.

According to a second aspect of the present invention, the waterproof structure of a wire leading portion may further comprise a holder that is fitted to the opening and faces an outer surface of the rubber cap secession prevention wall in a state where the wire is led, and the housing may have an end portion that holds the packing holder together with the holder.

According to the second aspect of the present invention, in addition to the effect according to the first aspect of the present invention, the following effects can be further shown. That is, the packing holder can be inserted into the housing by accommodating the packing holder in which the packing is installed in the housing after accommodating the circuit board in the housing, and fitting the holder into the opening of the housing. Accordingly, according to the present invention, in addition to the effect according to the first aspect of the present invention, the effect that the position of the packing holder can be determined and the effect that the movement of the rubber cap can be securely prevented can be further shown.

According to a third aspect of the present invention, the packing holder and the holder may have a bending maintenance portion that maintains bending of the wire led from the outer surface of the rubber cap secession prevention wall.

According to the third aspect of the present invention, in addition to the effect according to the second aspect of the present invention, the following effects can be further shown. That is, the bending state of the wire can be maintained by accommodating the packing holder in which the packing is installed in the housing after accommodating the circuit board in the housing, and fitting the holder into the opening of the housing. Accordingly, the wire that is led from the housing is securely maintained, and even if a tension force is applied to the wire, the force is prevented from reaching the electric connection portion of the circuit board. According to the present invention, in addition to the effect according to the second aspect of the present invention, the effect that the wire can be securely maintained and the effect that the connection state of the wire can be stabilized can be further shown.

The waterproof structure of a wire leading portion according to claim 1, wherein the packing holder has a board contact rib that is in contact with the cross-section of the circuit board.

According to the fourth aspect of the present invention, in addition to the effect according to any one of the first to third aspects of the present invention, the following effects can be further shown. That is, the circuit board can be maintained by accommodating the packing holder in which the packing is installed in the housing after accommodating the circuit board in the housing. Further, the rubber cap can be held in an appropriate state. Accordingly, the assembling work is not complicated. Further, an unstable sealing state is avoided. According to the present invention, in addition to the effect according to any one of the first to third aspects of the present invention, the effects that the workability is greatly heightened and the assembling state is stabilized can be further shown.

The present invention may be applied to an illumination unit as follows. That is, features of illumination function are added to the first aspect of the present invention. There is provided an illumination unit, which includes a wire, a rubber cap assembled with the wire, a circuit board that is a connection destination of the wire, a housing accommodating the circuit board, a packing holder accommodated next to the circuit board through an opening of the housing, and a packing assembled on an outer periphery of the packing holder to be in close contact with an inner surface of the housing, wherein the circuit board has a light source, a portion of the housing that faces the light source has at least light permeability, and the packing holder has a rubber cap secession prevention wall that is a wall formed in a direction that crosses an accommodation direction, a wire insertion hole formed to penetrate the rubber cap secession prevention wall, and a rubber cap accommodation chamber communicating with the wire insertion hole and continuing to an inner surface of the rubber cap secession prevention wall, and wherein the inner surface of the rubber cap secession prevention wall and a cross-section of the circuit board are formed to hold the rubber cap that is accommodated in the rubber cap accommodation chamber. The illumination unit has an advantageous effect that it is possible to provide a better illumination unit in addition to the advantageous effects of the waterproof structure according to the first aspect of the present invention.

Further, the present invention may be applied to an illumination structure of a charger connector as follows. That is, there is provided an illumination structure of a charger connector which includes an illumination unit adopting the waterproof structure according to the first to fourth aspects of the present invention, installed in the vicinity of a receiver-side connector of a charger connector that is composed of a feeder-side connector and the receiver-side connector to illuminate the receiver-side connector using light from the illumination unit. The illumination structure has an advantageous effect that it is possible to provide a better illumination structure of a charger connector in addition to the advantageous effects of the waterproof structure according to the first to fourth aspects of the present invention.

DETAILED DESCRIPTION OF THE EMBODIMENTS

A waterproof structure is adopted, in which with respect to a wire leading portion, an outer surface of a packing holder and an inner surface of a housing are sealed by a packing, and a rubber cap accommodation chamber of the packing holder and a wire are sealed by a rubber cap. Further, a waterproof structure is adopted, in which the rubber cap is held by the cross-section of the circuit board and an inner surface of the rubber cap secession prevention wall. In addition, a wire maintenance structure is adopted, in which the wire that is led from the outer surface of the rubber cap secession prevention wall is maintained in a bent state by respective bending maintenance portions of the packing holder and the holder.

Figure 1:
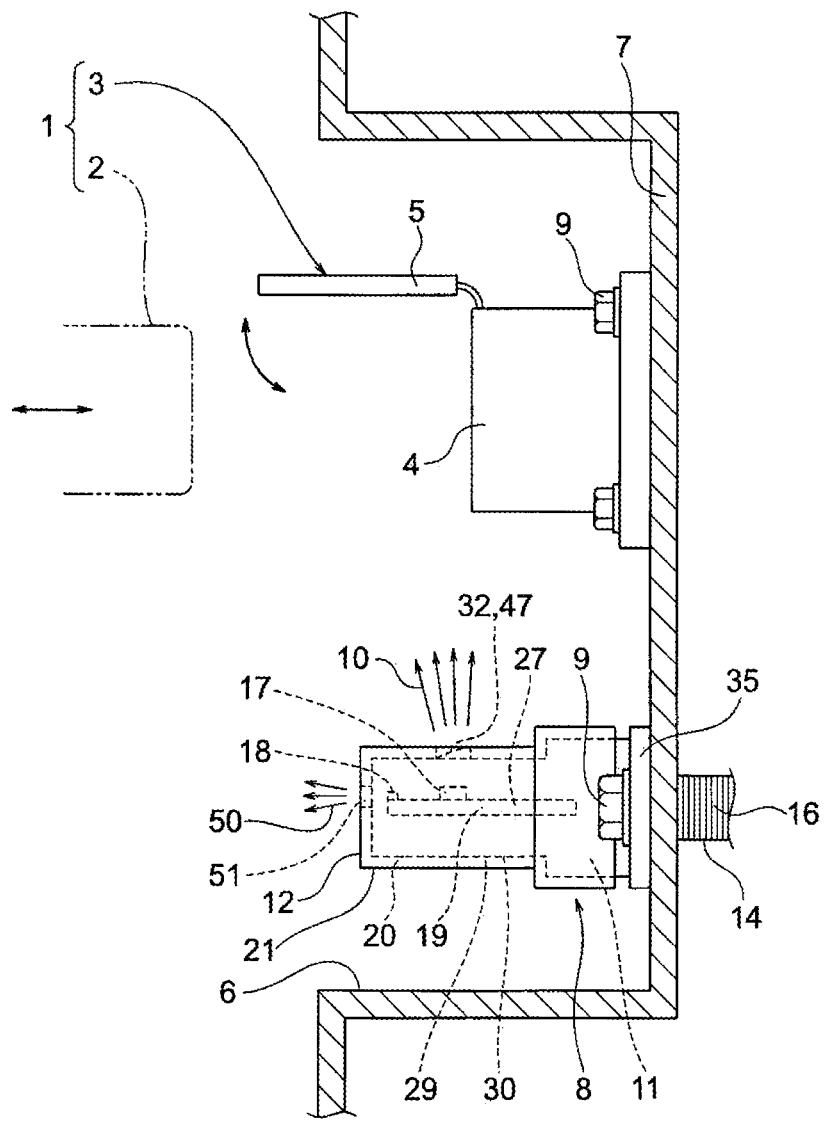
FIG. 1 is a view illustrating an arrangement of an illumination unit and a charger connector adopting a waterproof structure according to an embodiment of the present invention.
Figure 2:
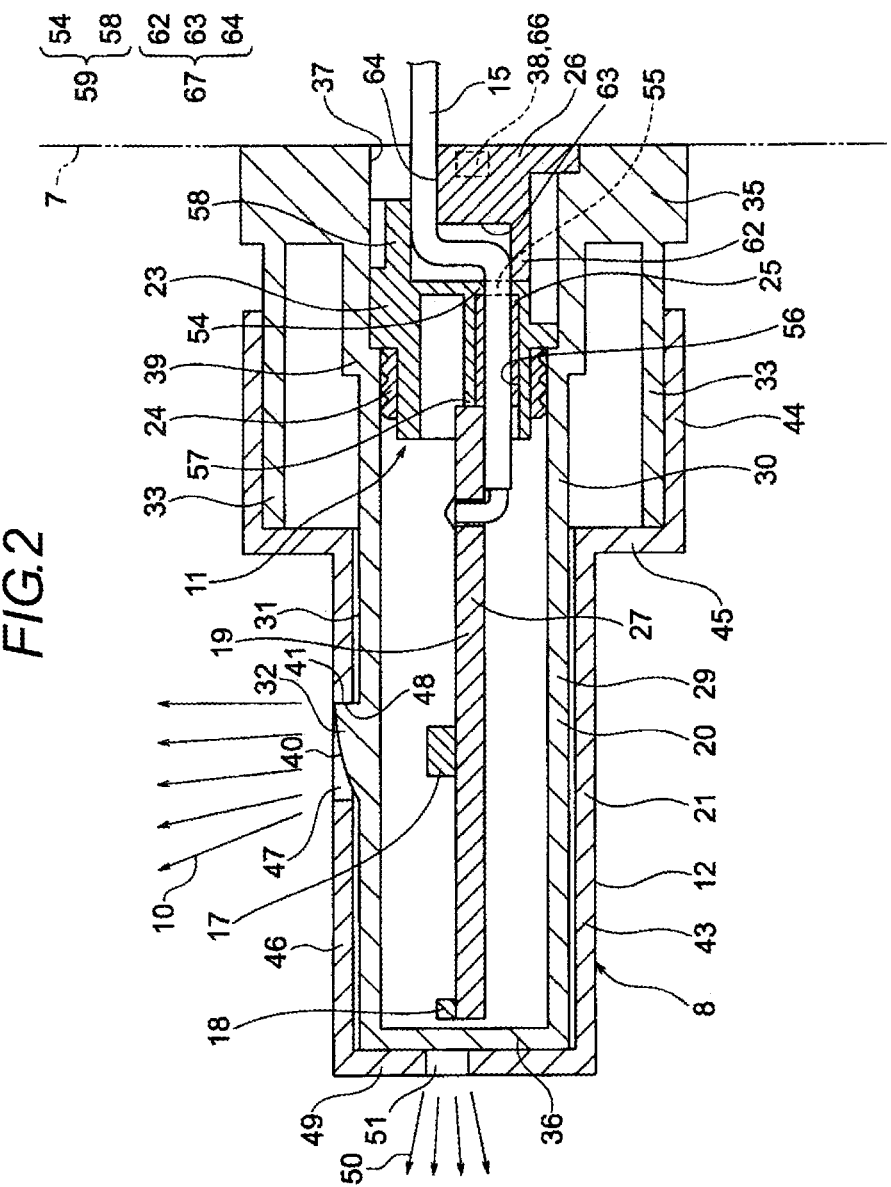
FIG. 2 is a cross-sectional view of a main portion of an illumination unit.
Figure 3:
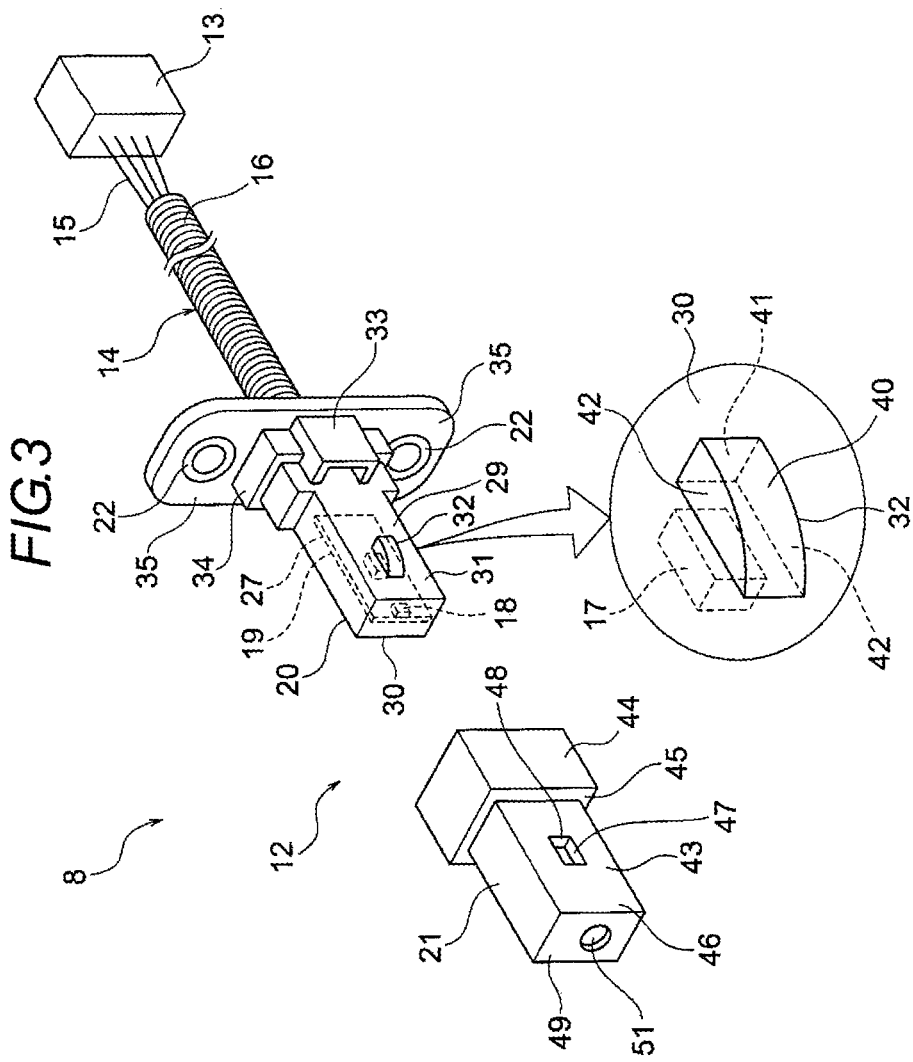
FIG. 3 is a perspective view of an illumination unit.
Figure 4:
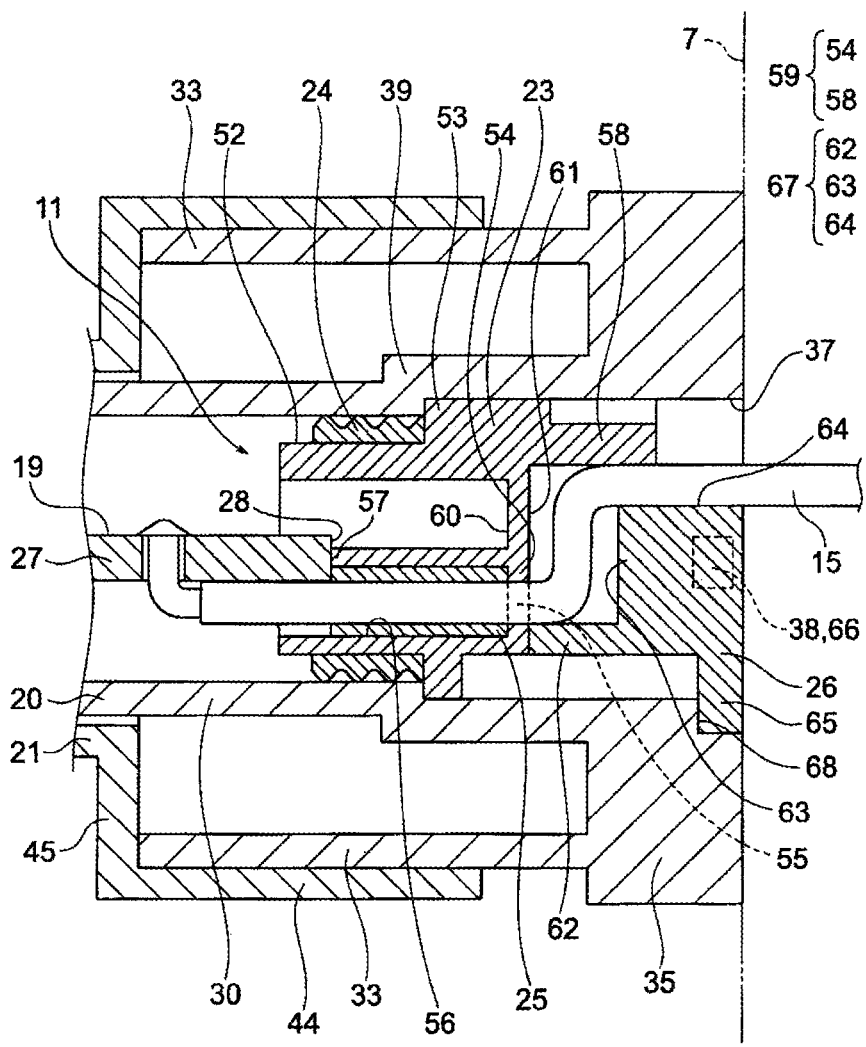
FIG. 4 is an enlarged view of the surroundings of a packing holder of FIG. 2.
Figure 5:
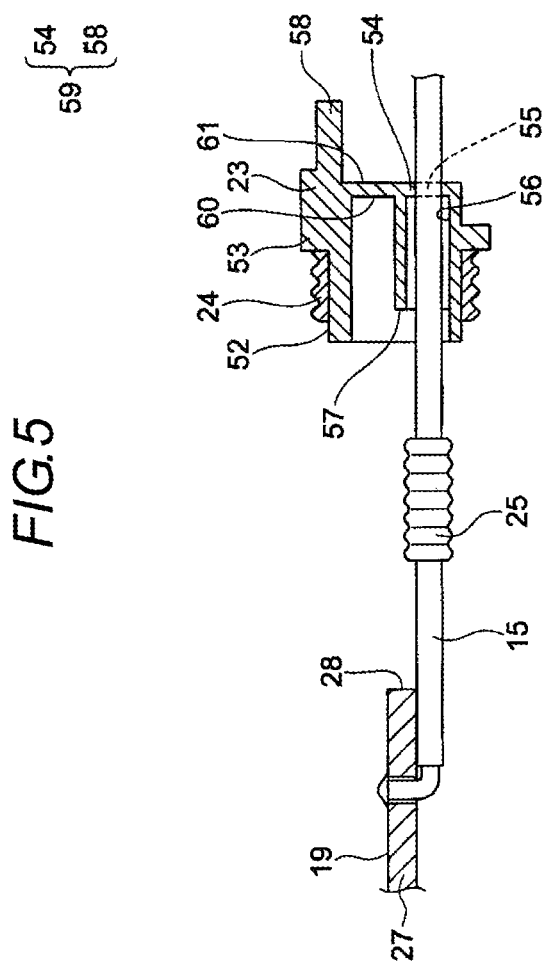
FIG. 5 is a view illustrating an assembly of a rubber cap and a packing holder.
Figure 6:
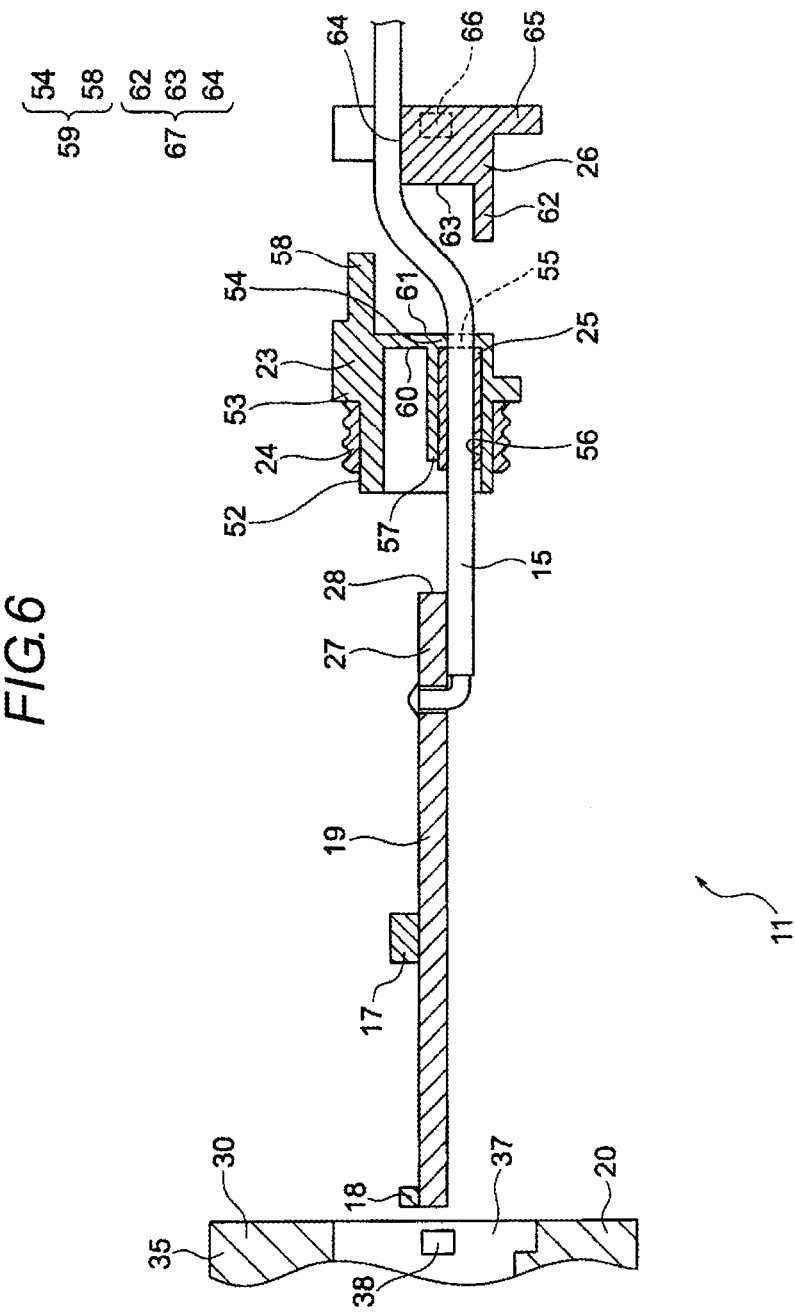
FIG. 6 is a view illustrating an assembly of respective members in a housing.

Hereinafter, embodiments will be described with reference to the drawings. FIG. 1 is a view illustrating an arrangement of an illumination unit and a charger connector adopting a waterproof structure according to the present invention. FIG. 2 is a cross-sectional view of a main portion of an illumination unit, and FIG. 3 is a perspective view of an illumination unit. FIG. 4 is an enlarged view of the surroundings of a packing holder of FIG. 2, FIG. 5 is a view illustrating an assembly of a rubber cap and a packing holder, and FIG. 6 is a view illustrating an assembly of respective members in a housing.

In the following description, detailed shapes, materials, numerical values, and directions are exemplary for easy understanding of the present invention, and may be appropriately modified to match the use, purpose, and specifications.

In an electric vehicle or a hybrid vehicle, a high-voltage battery is mounted to drive a motor. In charging this battery, a charger connector is used (in the following description, the charger connector may be any one of a DC type and an AC type).

In FIG. 1, the charger connector 1 is composed of a feeder-side connector 2 and a receiver-side connector 3 (vehicle-side inlet). The feeder-side connector 2 and the receiver-side connector 3 have a structure in which they can be assembled to each other or disassembled from each other. The receiver-side connector 3 has a charging inlet 4 and a cap 5. The receiver-side connector 3 is installed in a receiver-side accommodation chamber 6 that is arranged in a predetermined position of a vehicle. On a bottom wall 7 of the receiver-side accommodation chamber 6, an illumination unit 8 that adopts a waterproof structure according to the present invention is installed in addition to the receiver-side connector 3.

The illumination unit 8 is installed to illuminate the receiver-side connector 3 and to perform light-emitting display of the charging state. The receiving-side connector 3 and the illumination unit 8 are fixed to the bottom wall of the receiver-side accommodation chamber 6 by a fastening bolt 9.

The explanation of the feeder-side connector 2 and the receiver-side connector 3 will be omitted.

The illumination unit 8 is configured to illuminate the receiver-side connector with desired brightness through irradiation of light 10 toward the receiver-side connector 3. The illumination unit 8 is installed to facilitate an assembling/disassembling work of the feeder-side connector 2 and the receiver-side connector 3 at night or in a dark place. The illumination unit 8 has a waterproof structure 11 according to the present invention. Further, the illumination unit 8, although not specially limited thereto, has a timer function.

In FIGS. 1 to 3, the illumination unit 8 includes an illumination function unit 12 having the waterproof structure 11 according to the present invention, a connector (see FIG. 3) for connecting a charging circuit (not illustrated) of a vehicle, a harness portion 14 electrically connecting the illumination function unit 12 and the connector 13 to each other, and a fixing means (for example, a clip) for properly fixing the harness portion 14. The harness portion 14 is provided with a plurality of wires 15 and a Colgate tube 16 that protects the plurality of wires 15.

In FIGS. 1 to 4, the illumination function unit 12 includes a light source such as an LED 17 or a light-emitting display portion 18, a timer board assembly 19 mounting the light source thereon, a light-permissible housing 20 (housing), a non-light-permissible cover 21 (protector), a collar 22, a packing holder 23, a packing 24, a rubber cap 25, and a holder 26.

The waterproof structure 11 according to the present invention is adopted in a leading portion of the wire 15. The waterproof structure 11 includes the packing holder 23, the packing 24, and the rubber cap 25. The waterproof structure 11 has a structure in which the rubber cap 25 is held by the packing holder 23 and the circuit board 27 to be described later.

The timer board assembly 19 has a rectangular circuit board 27. On this circuit board 27, a predetermined circuit for driving the LED 17 and the light-emitting display portion 18 and a timer circuit. A conductor of the wire 15 is electrically connected to a connection portion of the circuit 18 by soldering or the like. The circuit board 27 has a cross-section 28 (see FIG. 4) that is formed as a portion holding the rubber cap 25. Further, the cross-section 28 is formed also as a connection portion of the packing holder 23.

The LED 17 is arranged to irradiate light 10 toward the receiver-side connector 3. Specifically, the LED 17 is arranged to match the position of a lock convex portion 32 to be described later. Further, the light-emitting display portion 18 is arranged to perform light-emitting display of the charging state. Further, the light-emitting display portion is not limited to the LED 17, but a lamp may be used The light-permissible housing 20 is formed of a synthetic resin material having the light permeability. In this embodiment, the light-permissible housing 20 is formed of a resin so that the housing is transparent as a whole. Since the light-permissible housing 20 is transparent as described above, it is composed of a light permission unit 29 as a whole.

The light-permissible housing 20 has a housing body portion 30 as a portion that fixedly accommodates the timer board assembly 19. Further, the light-permissible housing 20 has the lock convex portion 32 as a fitting portion with the non-light-permissible cover 21. Further, the light-permissible housing 20 has projection portions 33 and 34 as portions projecting outwardly from a side wall 31 of the housing body portion 30. Further, the light-permissible housing has a housing fixing portion 35 as a flange type portion that extends from the housing body portion 30 and the projection portions 33 and 34.

The housing body portion 30 is in the form of a tube having a rectangular cross-section. The housing body portion 30 having the above-described shape has a ceiling wall 36 formed in a position at a left end in FIG. 2 and an opening 37 formed in a position at a right end in FIG. 2. The opening 37 is arranged so that its open surface is positioned on the same plane as the bottom surface of the housing fixing portion 35. The opening 37 is formed as an insertion hole when the timer board assembly 19, the packing holder 23, and the holder 26 are accommodated. The opening 37 has a fitting concave portion 38 formed thereon as a fitting portion of the holder 26. The fitting concave portion 38 is in a concave shape.

The housing body portion has an end portion 39 provided in an inner position of the opening 37. The end portion 39 is formed to function as a stopper of which the inner surface portion determines the insertion amount of the packing holder 23 (see FIG. 4). Further, the left side (inside) of the portion, which functions as a stopper, is formed to function as a sealing surface against the packing 24 (see FIG. 4).

As described above, the lock convex portion 32 is installed as a fitting portion with the non-light-permissible cover 21. Further, the lock convex portion 32 is installed as a portion that guides the light 10 from the LED 17. Further, the lock convex portion 32 is installed as a portion that irradiates the light 10 toward the receiver-side connector 3. Since the light-permissible housing 20 is transparent as a whole, the lock convex portion 32 is also transparent.

The lock convex portion 32 includes a light-emitting surface 40 formed as a curved surface so that it gradually goes away from the side wall 31 of the housing body portion 30, an engagement surface 41 formed as a surface which is perpendicular to the side surface 31 that extends from the vertex portion of the light-emitting surface 40, and two side surfaces 42. The lock convex portion 32 is formed to have a shape of an engagement protrusion and to have a shape having a lens function to achieve light diffusion effect. In this embodiment, although not specially limited thereto, the light-emitting surface 40 is grained (not illustrated) (graining is effective in heightening the light diffusion effect). Further, the slope and size of the light-emitting surface 40 may be set in consideration of the irradiation range of the light 10. In this embodiment, the slope and the size of the light-emitting surface are set so as to brightly flash over the position of the charging inlet 4 of the receiver-side connector 3 and the position of the slightly left side of the charging inlet 4.

The light-emitting surface 40 is not limited to a curved surface, but may be an inclined flat surface. In this case, since the light 10 from the LED 17 is refracted according to the angle of the inclined surface, it is possible to adjust the irradiation range.

The housing fixing portion 35 is a portion that is fixed to the bottom wall 7 of the receiver-side accommodation chamber 6 by bolt fastening, and is provided with a metal collar 22.

The non-light-permissible cover 21 is formed using a synthetic resin material that does not have light permeability. In this embodiment, the non-light-permissible cover 21 is detachably provided on the light-permissible housing 20. The non-light-permissible cover 21 includes a first cover portion 43 that covers the side wall 31 and the ceiling wall 36 of the housing body portion 30 of the light-permissible housing 20, a second cover portion 44 that covers the projection portions 33 and 34 of the light-permissible housing 20, and a cover end portion 45 that connects the first and second cover portions to each other.

On a side wall 46 of the first cover portion 43, a rectangular lock hole portion 47 that penetrates the first cover portion 43 is provided. This lock hole portion 47 is provided as a fitting portion with the light-permissible housing 20. Further, the lock hole portion 47 is provided as a portion that passes the light 10 from the LED 17. The lock hole portion 47 is arranged to match the positions of the lock convex portion 32 and the LED 17.

The lock hole portion 47 is formed so that the lock convex portion 32 is inserted into and fitted to the lock hole portion 47. The reference numeral 48 in the lock hole portion 47 denotes an engagement surface. This engagement surface 48 is engaged with the engagement surface 41 of the lock convex portion 32 through surface contact.

On a ceiling wall 49 of the first cover portion 43, a light-permeable window 51 through which the light 50 from the light-emitting display portion 18 passes is provided. In this embodiment, the light-permeable window 51 is in the form of a circle.

In FIGS. 2 and 4, the packing holder 23 is formed using a synthetic resin material having insulating property. The packing holder 23 is inserted into or accommodated in the housing body portion 30 of the light-permissible housing 20 in a state where the packing 24 is installed on the outer periphery of the packing holder 23 or a plurality of wires 15 are penetratingly inserted into the packing holder 23.

In FIG. 4, the packing holder 23 has a packing assembly portion 52, a position determination portion 53, a rubber cap secession prevention wall 54 (wall), a wire insertion hole 55, a rubber cap accommodation chamber 56, a board contact rib 57, and a wire maintenance wall 58. The packing holder 23, although not specially limited thereto, is formed as a member having the cross-sectional shape as illustrated in the drawing. In the above-described configuration of the packing holder 23, the rubber cap secession prevention wall 54 and the wire maintenance wall 58 are provided as a bending maintenance portion 59 on the side of the packing holder 23.

The packing assembly portion 52 is a portion for assembling the packing 24, and is arranged on the outer periphery of the packing holder 23. In this embodiment, the packing holder 23 is arranged in a position on the side of the circuit board 27 when the packing holder 23 is accommodated. The packing 24 is used as a sealing member. The position determination portion 53 is formed to be in contact with a portion that functions as a stopper of the end portion 39 of the housing body portion 30.

The rubber cap secession prevention wall 54 is formed as a wall formed in a direction that crosses (is perpendicular to) the accommodation direction (insertion direction) of the packing holder 23. If it is assumed that the surface that becomes the side of the circuit board 27 when the packing holder 23 is accommodated is an inner surface 60 and the opposite side is an outer surface 61 in the rubber cap secession prevention wall 54, a substantially cylindrical rubber cap accommodation chamber 56 is formed on the side of the inner surface 60.

The rubber cap accommodation chamber 56 is formed to watertightly accommodate the wire 15 in a state where the rubber cap 25 is assembled in the rubber cap accommodation chamber 56. The rubber cap accommodation chamber 56 is formed to project to the side of the circuit board 27. The rubber cap 25 is formed to be crushed only to the extent that corresponds to the length of the rubber cap accommodation chamber 56.

A portion of the inner surface 60 of the rubber cap secession prevention wall 54, which is a part of the rubber cap accommodation chamber 56, becomes a portion for holding the rubber cap 25. This portion functions as the secession prevention portion of the rubber cap 25. In the center of the portion, a wire insertion hole 55 is penetratingly formed. The wire insertion hole 55 is formed as a portion into which the wire 15 is penetratingly inserted.

The rubber cap accommodation chamber 56 is formed so that the portion which corresponds to the projecting front end thereof becomes a board contact rib 57. The board contact rib 57 is formed as a portion that is in contact with the cross-ssection 28 of the circuit board 27. The board contact rib 57 is formed as a portion which maintains the circuit board 27 or a portion which performs restriction so that the rubber cap 25 is not crushed too much.

On the outer surface 61 of the rubber cap secession prevention wall 54, a wire maintenance wall 58 that functions as a bending maintenance portion 59 is formed to project together with the outer surface 61. The wire maintenance wall 58 is arranged in a position that is apart from the wire insertion hole 55. Specifically, the wire insertion hole 55 and the rubber cap accommodation chamber 56 are arranged on the lower side in the drawing, and the wire maintenance wall 58 is arranged on the upper side in the drawing. The rubber cap secession prevention wall 54 and the wire maintenance wall 58 are arranged to form a reverse shaped wall.

The holder 26 is formed using a synthetic resin material having insulating property. The holder 26 is formed to fit in the opening 37 of the housing body portion 30. The holder 26 is formed to hold the packing holder 23 together with the end portion 39 of the housing body portion 30 to prevent the secession of the packing holder 23. Further, the holder 26 is formed to maintain the bending of the wire 15 that is led from the outer surface 61 of the rubber cap secession prevention wall 54.

The holder 26 has a first wire maintenance wall 62, a second wire maintenance wall 63, a wire support portion 64, a guide portion 65, and a fitting convex portion 66. The holder 26, although not specially limited thereto, is formed as a member having a cross-sectional shape as illustrated in the drawing. In the configuration of the holder 26, the first wire maintenance wall 62, the second wire maintenance wall, and the wire support portion 64 are installed as the bending maintenance portion 67 of the holder side 26.

The first wire maintenance wail 62 and the second wire maintenance wall 63 are arranged to form an L-shaped wall. The first maintenance wall 62 is arranged on the lower side in the drawing, and is formed to project so that the front end thereof becomes in contact with the lower position (outer position) that is lower than the wire insertion hole 55 of the packing holder 23.

The second wire maintenance wall 63 is formed to be opposite to the rubber cap secession prevention wall 54 of the packing holder 23 at a predetermined interval. Further, the second wire maintenance wall 63 is formed in a direction that crosses (is perpendicular to) the accommodation direction (insertion direction) of the holder 26.

The wire support portion 64 is arranged on the right side in the drawing, and is arranged in the vicinity of the wire maintenance wall 58 of the packing holder 23. The wire support portion 64 is formed to hold the wire 15 together with the wire maintenance wall 58.

The guide portion 65 is a portion that is inserted into the opening 37 of the housing body portion 30, and has the same function as the position determination portion 53 of the packing holder 23. In this embodiment, the guide portion 65 is positioned to be in contact with the end portion 68 formed on the opening 37. Further, when the position determination thereof is made, the fitting convex portion 66 is fitted to the fitting concave portion 38 of the opening 37. The fitting convex portion 66 is in a convex shape as a so-called engagement protrusion.

The bending maintenance portion 59 of the packing holder 23 and the bending maintenance portion 67 of the holder 26 are formed to maintain the bending of the wire 15 that is led from the outer surface 61 of the rubber cap secession prevention wall 54.

The wire 15 is bent in a substantially crank shape as illustrated and is maintained by the packing holder 23 and the holder 26. In this embodiment, the reason why the wire 15 is maintained in a bent state is that even if an external force is applied to the wire 15 in the wire leading direction, the external force is prevented from being applied to the connection portion of the wire 15 against the timer board assembly 19.

In FIG. 5, the rubber cap 25 is assembled on the outer surface of the wire 15. The rubber cap 25 is assembled so that the rubber cap 25 becomes in close contact with the outer surface of the wire 15 due to its elasticity. The rubber cap 25 is assembled in a slidable state along the outer surface of the wire 15. In addition to the rubber cap 15, the packing holder 23 is assembled with the wire 15. The packing 24 is assembled on the packing assembly portion 52 of the packing holder 23. Further, the wire 15 is electrically connected to the connection portion of the circuit substrate 27.

If the packing holder 23 in the assembled state is moved to slide toward the cross-section 28 of the circuit board 27, as illustrated in FIG. 6, the rubber cap 25 is accommodated in the rubber cap accommodation chamber 56 of the packing holder 23. Further, once the holder 26 is set in the rear of the packing holder 23 and the timer board assembly 19, the packing holder 23, and the holder 26 are accommodated in the housing body portion 30, the assembling state is completed as shown in FIGS. 2 and 4.

The rubber cap 25 is watertightly accommodated in the rubber cap accommodation chamber 56, and is held by the inner surface 60 of the rubber cap secession prevention wall 54 and the cross-section 28 of the circuit board 27 to be in a state where its movement is restricted. The wire 15 led from the outer surface 61 of the rubber cap secession prevention wall 54 is maintained in a twice-bent state, that is, in a substantially crank shape, by means of the bending maintenance portion 59 of the packing holder 23 and the bending maintenance portion 67 of the holder 26.

In the above-described configuration and structure, the light 10, which is irradiated from the LED 17 to the receiver-side connector 3 as illustrated in FIG. 1, brightly flashes over the receiver-side connector 3, and this facilitates the assembling/disassembling work of the feeder-side connector 2 and the receiver-side connector 3. Further, it can be confirmed whether the charging is completed through the light 50 from the light-emitting display portion 18.

In summary, the waterproof structure 11 of the wire leading portion according to an embodiment of the present invention includes the wire 15, the rubber cap 25 assembled with the wire 15, the circuit board 27 that is a connection destination of the wire 15, the light-permissible housing 20 accommodating the circuit board 27, the packing holder 23 accommodated next to the circuit board 27 through the opening 37 of the light-permissible housing, the packing 24 assembled on the outer periphery of the packing holder 23 to be in close contact with the inner surface of the housing body portion 30 of the light-permissible housing 20, and the holder 26 fitted to the opening 37.

In the above-described configuration, the packing holder 23 has the rubber cap secession prevention wall 54 (wall), the wire insertion hole 55 that penetrates the rubber cap secession prevention wall 54, and the rubber cap accommodation chamber 56 that communicates with the wire insertion hole 55 and continues to the inner surface 60 of the rubber cap secession prevention wall 54. The inner surface 60 of the rubber cap secession prevention wall 54 and the cross-section 28 of the circuit board 27 are configured to hold the rubber cap 25 that is accommodated in the rubber cap accommodation chamber 56.

As described above with reference to FIGS. 1 to 6, according to the waterproof structure 11 of the wire leading portion, by accommodating the packing holder 23 having the packing 24 in the housing body portion 30 after accommodating the timer board assembly 19 that includes the circuit board 27 in the housing body portion 30, the rubber cap 25 can be held by the cross-section 28 of the circuit board 27 and the inner surface 60 of the rubber cap secession prevention wall 54 of the packing holder 23. Accordingly, the rubber cap 25 is not moved even if the internal pressure of the housing body portion 30 is changed.

In addition, according to the waterproof structure of the wire leading portion, since the packing assembly portion 52 of the packing holder 23 and the inner surface of the housing body portion 30 are sealed by the packing 24, and the rubber cap accommodation chamber 56 of the packing holder 23 and the wire 15 are sealed by the rubber cap 25, the waterproof structure is distinguished from the structure in the related art in which the sealing is achieved by one rubber cap, and thus the rubber cap 25 and the packing 24 can be small-sized. Accordingly, it is not necessary to perform assembling with low workability, such as pressing with strong force.

Further, according to the waterproof structure 11 of the wire leading portion, by accommodating the packing holder 23 in the housing body portion 30, the movement prevention of the rubber cap 25 and the sealing of respective portion can be completed. Accordingly, the assembling work is not complicated.

Various modifications may be made without changing the general purport of the present invention.

In the above-described description, it is exemplified that the illumination unit is adopted to illuminate the charger connector. However, the illumination unit may be used for various purposes in addition to the illumination of the charger connector.

Detailed examples of illumination units may include illumination units (which may be called LED units or LED lamp modules) which flash over the interior of a vehicle, the interior of change boxes, such as a console box, a glove box, a small-piece accommodation pocket, or an ashtray, a cup holder, or a person's feet as light sources for interior illumination, and illumination units which are used as stop lamps or tail lamps as light sources for exterior illumination.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A waterproof structure of a wire leading portion comprising:
   a wire;
   a rubber cap assembled with the wire;
   a circuit board that is a connection destination of the wire;
   a housing accommodating the circuit board;
   a packing holder accommodated next to the circuit board through an opening of the housing; and
   a packing assembled on an outer periphery of the packing holder to be in close contact with an inner surface of the housing,
   wherein the packing holder includes:
      a rubber cap secession prevention wall that is a wall formed in a direction that crosses an accommodation direction;
      a wire insertion hole formed to penetrate the rubber cap secession prevention wall; and a rubber cap accommodation chamber communicating with the wire insertion hole and continuing to an inner surface of the rubber cap secession prevention wall, and wherein the inner surface of the rubber cap secession prevention wall and a cross-section of the circuit board are formed to hold the rubber cap that is accommodated in the rubber cap accommodation chamber.

2. The waterproof structure of a wire leading portion according to claim 1, further comprising a holder that is fitted to the opening and faces an outer surface of the rubber cap secession prevention wall in a state where the wire is led, wherein the housing has an end portion that holds the packing holder together with the holder.

3. The waterproof structure of a wire leading portion according to claim 2, wherein the packing holder and the holder have a bending maintenance portion that maintains bending of the wire led from the outer surface of the rubber cap secession prevention wall.

4. The waterproof structure of a wire leading portion according to claim 1, wherein the packing holder has a board contact rib that is in contact with the cross-section of the circuit board.

* * * * *